United States Patent Office 3,447,948
Patented June 3, 1969

3,447,948
RESIN COATED CELLULOSIC SHEET HAVING REDUCED TENDENCY TO ACCUMULATE AN ELECTROSTATIC CHARGE
Walter T. Koch, Drexel Hill, Pa., assignor to FMC Corporation, Philadelphia, Pa., a corporation of Delaware
No Drawing. Filed Sept. 2, 1965, Ser. No. 484,716
Int. Cl. B44d 1/30; D21h 1/22
U.S. Cl. 117—73                                    9 Claims

ABSTRACT OF THE DISCLOSURE

A composite sheet including a plasticized non-fibrous, water-insoluble cellulosic base sheet impregnated with a small amount of water-soluble salt to inhibit the formation of electrostatic charges in the sheet during handling and a polymer coating firmly adhering to the base sheet is disclosed herein.

---

Cellulosic films have a tendency to develop static charges when used in automatic packaging machinery. This tendency is even more pronounced in resin coated cellulosic films. When dealing with lighter weight more flexible films, a loss of operability by jamming of the machine during the packaging operation often results. This problem has been treated in various ways including the application of liquid antistatic compositions to the film surface, machine modification, and the incorporation of antistatic agents in the film coating.

It is an object of the present invention to provide a polymer coated non-fibrous cellulosic sheet having a reduced tendency to accumulate an electrostatic charge.

It is another object of this invention to provide a thermoplastic resin coated regenerated cellulose film having a reduced tendency to accumulate an electrostatic charge.

It is another object of this invention to provide a method of preparing a polymer coated non-fibrous cellulosic sheet having a reduced tendency to accumulate an electrostaic charge.

These and other objects are accomplished in accordance with the present invention which comprises a non-fibrous cellulosic base sheet impregnated with from about 0.06 to about 3.0%, based on the weight of said sheet, of a water-soluble, ammonium or metal salt of an inorganic mineral acid or organic carboxylic acid, and a coating firmly adhering to said base sheet comprising nitrocellulose or a thermoplastic film-forming resin.

The method of this invention comprises contacting a non-fibrous, water-insoluble cellulosic sheet with an aqueous solution of a water-soluble, ammonium or metal salt of an inorganic mineral acid or an organic carboxylic acid at a salt concentration of from 0.02 to 1.0% by weight, drying the sheet, and coating the sheet on at least one side with nitrocellulose or a thermoplastic film-forming resin.

The non-fibrous, water-insoluble cellulosic base sheet of this invention is preferably a clear regenerated cellulose film. However, other cellulosic films including cellulose ester, cellulose ether, hydroxyalkyl cellulose ether, and mixed cellulose ether-ester films are useful base sheets for this invention. While these base films are essentially non-fibrous they may be reinforced with fibrous materials incorporated within the film structure.

It is advantageous to incorporate a plasticizing agent as well as an anchoring agent in the cellulosic base film to provide additional flexibility, and adhesion for the top coating. The preferred and most widely used plasticizer material for regenerated cellulose film is glycerine generally applied to the wet cellulosic sheet from an aqueous solution at concentrations up to about 10%. Anchoring agents include, for example, water-soluble precondensates of urea-formaldehyde, and melamine-formaldehyde, and polyalkylenimines. This adhesion promoting material may be advantageously applied to the base sheet from the same aqueous solution containing the plasticizing agent at concentrations up to about 1%. If desired, a small amount of an acid or basic curing aid for the anchoring resin may also be added to the bath.

The coatings for the base film include nitrocellulose or cellulose nitrate and thermoplastic film-forming resins which include, for example, copolymers of predominantly vinylidene chloride and at least one copolymerizable monomer; vinyl resins such as polyvinyl chloride, polyvinyl acetate, vinyl chloride-vinyl acetate copolymers, ethylene-vinyl acetate copolymers, ethylene-alkyl acrylate copolymers and the like; acrylic resins such as acrylonitrile polymers and copolymers, alkyl acrylate and methacrylate copolymers, and the like; and polyolefin resins such as polyethylene, polypropylene, ethylene-propylene copolymers, and the like. Any resin coating which will firmly adhere to the base film and supply moisture-proofness and/or heat-sealability as well as other packaging properties for the composite sheet, is suitable for this invention.

The above described thermoplastic coating materials, in many instances, may be applied to the cellulosic base sheet in the form of an aqueous dispersion or as a hot melt, however, it is preferred for the method of this invention that the coating material be applied dissolved in an organic solvent since it has been unexpectedly found that the cellulosic base impregnated with the prescribed amount of water-soluble salt has a reduced tendency to dissolve or hold the more polar solvents used in coating lacquers. Another advantage of the method of this invention resides in the reduced tendency of the treated cellulosic base sheet toward static build-up during the coating operation.

Organic solvents for nitrocellulose and thermoplastic resins include, for example, tetrahydrofuran, toluene, hexane, lower alkanols, lower alkyl acetates, acetone, methyl ethyl ketone, methyl isobutyl ketone and the like, as well as mixtures of these materials.

The water-soluble salts of this invention include ammonium and metal salts of inorganic mineral acids and organic carboxylic acids which are applied to the cellulosic base film in aqueous solutions at concentrations ranging from 0.02 to 1.0% by weight. The water-soluble salt is preferably incorporated in the plasticizer bath but may also be used in a separate bath prior to or following the plasticizing and anchoring baths. If an aminoform type of anchoring agent is employed in the same bath, the amount of water-soluble salt used must be below that at which resin precipitation occurs.

Examples of the metal portion of the water-soluble salt include sodium, potassium, lithium, calcium, barium, strontium, magnesium and zinc.

The mineral acids from which water-soluble salts are derived include, for example, hydrochloric, nitric, phosphoric, phosphorous, boric, silicic, sulfuric and chloric acids. Anions of mineral acids which have not been isolated, are unstable or exist only in solution, such as the carbonate ions, are also included herein.

Examples of organic carboxylic acids include aliphatic and substituted aliphatic mono and polycarboxylic acids, and aromatic mono and polycarboxylic acids. Specific examples include fatty acids having from 1 to 32 carbon atoms, e.g., formic, acetic, chloroacetic, propionic, butyric, valeric, capric, lauric, palmitic, stearic, oleic, linoleic, and melissic acids; olefinic acids, e.g., acrylic, methacrylic and crotonic acid; hydroxy acids, e.g., lactic acid; aliphatic polycarboxylic acids, e.g., maleic, fumaric, malonic, succinic, sebacic, azelaic, oxalic, tartaric, citric, and itaconic acid; aromatic carboxylic acids e.g., benzoic, chlorbenzoic, salicylic, mesitylenic, phthalic bibenzoic, naphthoic and pyromellitic acid; and cyclic carboxylic acids, e.g., cyclohexanoic, cyclohexyl butyric, methyl cyclohexyl acetic, cyclohexyl succinic, benzene hexachloride acetic, furoic, picolinic and nicotinic acid.

From the standpoint of availability and costs, the preferred water-soluble salts are the ammonium, alkali or alkaline earth metal chlorides, sulfates, lactates and lower fatty acid carboxylates such as formates and acetates.

The following examples are set forth to demonstrate the invention.

EXAMPLE I

A wet gel regenrated cellulose film having a dry thickness of about 1 mil was run through an aqueous bath containing the following ingredients:

50 g. glycerol
30 ml. of a 26% aqueous solution of melamineformaldehyde precondensate
3 ml. lactic acid (85%)
917 ml. distilled water The glycerol served as the plasticizing agent while the precondensate and acid promoted adhesion for the subsequently applied coating.

The treated film was dried and then conditioned at a relative humidity of 45%. The electrical resistivity of the film was measured and then a coating applied comprising an 8 wt. percent solution of a copolymer of about 90% vinylidine chloride and acrylonitrile in a solvent mixture of 90 parts by volume of tetrahydrofuran and 10 parts of toluene. After drying the electrical resistivity of the coated film was measured.

A coated regenerated cellulose film was prepared in the same manner as described above except that the aqueous bath also contained 3.0 grams of potassium lactate. Electrical resistivity measurements were made of the dried, uncoated film and the dried, coated film. These measurements are given in the following table.

TABLE I

| Film: | Resistivity -ohms/sq. inch |
|---|---|
| Salt-free cellulose | $10 \times 10^8$ |
| Coated salt-free cellulose | $15 \times 10^8$ |
| Salt containing cellulose | $4.1 \times 10^8$ |
| Coated salt containing cellulose | $8.6 \times 10^8$ |

It can be seen that the salt impregnated film had a decrease in resistivity of about half in each case compared to the untreated film.

EXAMPLE II

A wet gel regenerated cellulose film having a dry thickness of about 1 mil was run through an aqueous bath containing the following ingredients:

50 g. glycerol
30 ml. of a 26% aqueous solution of melamineformaldehyde precondensate
0.3 ml. lactic acid (85%)
917 ml. distilled water The treated film was dried, conditioned at a relative humidity of 45%, and coated with a 12% solution of a vinylidene chloride terpolymer (different than Example I) in a solvent mixture of 65 parts by volume of tetrahydrofuran and 35 parts of toluene. After drying, the coated film was measured for electrical resistivity, and for static build-up. Measurement of static build-up was obtained by a procedure which consisted of wrapping a piece of the test film (2½ x 5 in.) around a small, cylindrical glass jar (circum.=4.32 in.) and fastening the film in place with double backed adhesive tape. The test film had been conditioned at a relative humidity of 43%. The glass jar was affixed to a motor driven shaft and made to revolve concentrically at 265 r.p.m. The shiny surface of a square of aluminum foil (2½ x 2½ in.) was brought slowly and evenly against the revolving surface of the test film with negligible pressure. At the moment of contact a stop watch was started and the foil was permitted to remain in contact with the test film for exactly 15 seconds. At the instant of removal of the foil, the amount of static build-up on the surface of the test film was measured by noting the maximum deflection of the gauge needle of a Simco Electrostatic Locator Type E positioned ¼ inch below the revolving jar. Five test samples of the test film were run and the average of the five values obtained was taken as an indication of the static build-up of the test film.

A coated regenerated cellulose film was prepared in the same manner as described above in Example II except that 0.5 gram of sodium chloride was dissolved in the aqueous bath. This film was also measured for resistivity and electrostatic build-up. The table below reports these measurements.

TABLE II

| Film | Resistivity, ohms/sq. inch | Static build-up units |
|---|---|---|
| Salt-free coated film | $95 \times 10^8$ | 41g |
| Salt containing, coated film | $25 \times 10^8$ | 106 |

The improvement in resistivity and static build-up for the coated film, as seen above, is exceptional.

EXAMPLE III

In order to show the effect of the incorporation of the water-soluble salt in the film on residual solvents from a lacquer coating composition, regenerated cellulose films of the same weight, pretreated in aqueous baths containing varying amounts of sodium chloride, and solvent coated with a lacquer comprising 17% by weight of a vinylidene chloride copolymer in a solvent mixture of 65 parts by volume of tetrahydrofuran (THF) and 35 parts of toluene were examined for solvent retention. The following table shows the average results.

TABLE III

| Salt in treating bath, percent by weight | Residual solvent (average p.p.m.[1]) | |
|---|---|---|
|  | THF | Toluene |
| None | 501 | 288 |
| 0.06 | 444 | 231 |
| 0.10 | 348 | 235 |
| 0.20 | 163 | 69 |

[1] Parts per million.

From the above table is can be seen that there is a generally pronounced decrease in solvent residue in the film with increased amounts of incorporated salts.

EXAMPLE IV

In order to demonstrate that coated, salt containing film performs better than low salt or salt-free film on high speed, push feed, automatic packaging machinery, coated films as described in Example III having the cellulose base film pretreated with varying amounts of sodium chloride in an aqueous bath were tested in this type of packaging operation. Mill rolls of the test films were used in a push feed, automatic packaging machine to wrap boxes. If at least 100 consecutive boxes were satisfactorily wrapped the film passed the test. The following table shows the results of this test procedure.

TABLE IV

| Salt in bath, percent by weight | Operable rolls per rolls tested | Acceptability percent |
|---|---|---|
| 0.02 | ½₇ | 2 |
| 0.07 | ⅙ | 17 |
| 0.19 | ⅜ | 50 |

As the amount of salt increases the percentage of acceptability also increases for high speed, push feed packaging operations.

It was also observed, during the coating operation, that high salt content base sheets exhibited little or no static at the wind-up end of the coater whereas the salt-free base films developed a dangerously high level of static charge.

In general, the cellulosic film will pick up about three times the amount of salt that is incorporated in the aqueous bath. Thus, a bath salt concentration of 0.5 weight percent will incorporate about 1.5% of salt based on the weight of the film.

The lower level of the prescribed range of salt incorporation is based on the amount necessary, in many cases, to obtain any improvement in the film while the higher level is dictated by the necessity of preventing deleterious effects on other film properties and also by the fact that higher levels, over those prescribed, do not produce a corresponding improvement in the desired film properties.

It is recognized that it is known to incorporate water-soluble salts in cellulose films for the purpose of producing a plasticizing or softening effect, however, the lowest amounts used for this purpose are at least several times higher than the highest amounts given for this invention, and, as far as it is known, it has never been recognized in the art that the incorporation of the small amounts of salts in the cellulose base film would provide coated film having the improvements set forth above.

Various changes and modifications may be made practicing the invention without departing from the spirit and scope thereof and, therefore, the invention is not to be limited except as defined in the appended claims.

I claim:
1. A composite sheet consisting essentially of a non-fibrous, water-insoluble cellulosic base sheet impregnated with a cellulosic plasticizer, an anchoring agent selected from the group consisting of water-soluble aldehyde resin precondensates and polyalkyleneimines, and from about 0.06 to about 3.0%, based on the weight of said base sheet, of a water-soluble ammonium or metal salt of an inorganic mineral acid or organic carboxylic acid, and a coating firmly adhering to at least one side of said base sheet comprising nitrocellulose or a thermoplastic film-forming resin.

2. The composite sheet of claim 1 wherein the base sheet is regenerated cellulose film.

3. The composite sheet of claim 2 wherein the salt is an ammonium or alkali metal chloride.

4. The composite sheet of claim 2 wherein the salt is an alkali metal lactate.

5. The composite sheet of claim 2 wherein the film-forming resin is a copolymer of predominantly vinylidene chloride and at least one copolymerizable monomer.

6. A method of preparing a composite sheet which comprises contacting a wet gel, non-fibrous, water-insoluble cellulosic sheet with an aqueous solution of a cellulosic plasticizer, an anchoring agent, selected from the group consisting of water-soluble aldehyde resin precondensates and polyalkyleneimines, and a water-soluble ammonium or metal salt of an inorganic mineral acid or an organic carboxylic acid at a salt concentration of from about 0.02 to about 1.0% by weight, drying the sheet, coating the sheet on at least one side with an organic solvent solution of nitrocellulose or a thermoplastic film-forming resin and drying the coating.

7. The method of claim 6 wherein the cellulosic sheet is regenerated cellulose.

8. The method of claim 7 wherein the salt is an ammonium or alkali metal chloride.

9. The method of claim 7 wherein the salt is an alkali metal lactate.

References Cited
UNITED STATES PATENTS

| | | | |
|---|---|---|---|
| 2,086,544 | 7/1937 | Dreyfus | 117—139.5 X |
| 2,462,185 | 2/1949 | Hauser | 117—76 X |
| 2,752,266 | 6/1956 | Hofrichter et al. | 117—76 |
| 2,763,571 | 9/1956 | Wooding et al. | 117—76 X |
| 2,992,133 | 7/1961 | Zehrung | 117—76 |
| 3,075,859 | 1/1963 | Relph et al. | 117—155 X |
| 2,980,554 | 4/1961 | Gentile et al. | 117—144 X |

WILLIAM D. MARTIN, *Primary Examiner.*

H. J. GWINNELL, *Assistant Examiner.*

U.S. Cl. X.R.

117—76, 144, 145

UNITED STATES PATENT OFFICE
CERTIFICATE OF CORRECTION

Patent No. 3,447,948      Dated June 3, 1969

Inventor(s) Walter T. Koch

It is certified that error appears in the above-identified patent and that said Letters Patent are hereby corrected as shown below:

Column 2, line 16, after "nitrile", insert --and methacrylonitrile--. Column 3, line 14, "regenrated" should read --regenerated--. Column 4, TABLE II, under the heading "Static Build-Up Units" the numbers "413" & "106" should read respectively --416-- & --103--. Column 5, line 24, "cellulose" should read --cellulosic--.

SIGNED AND SEALED
MAR 17 1970

(SEAL)
Attest:

Edward M. Fletcher, Jr.
Attesting Officer

WILLIAM E. SCHUYLER, JR.
Commissioner of Patents